United States Patent
Kim et al.

(10) Patent No.: US 11,290,040 B2
(45) Date of Patent: Mar. 29, 2022

(54) LINEAR MOTOR AND LINEAR MOTOR CONTROL SYSTEM

(71) Applicant: KOREA INSTITUTE OF MACHINERY & MATERIALS, Daejeon (KR)

(72) Inventors: Hyunchang Kim, Daejeon (KR); Dongwoo Kang, Daejeon (KR); Kwang-Young Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 229 days.

(21) Appl. No.: 16/684,951

(22) Filed: Nov. 15, 2019

(65) Prior Publication Data
US 2020/0161998 A1    May 21, 2020

(30) Foreign Application Priority Data
Nov. 15, 2018   (KR) .......................... 10-2018-0140961

(51) Int. Cl.
*H02P 7/025*       (2016.01)
*H02P 6/16*        (2016.01)
(Continued)

(52) U.S. Cl.
CPC ............ *H02P 7/025* (2016.02); *H02K 11/215* (2016.01); *H02K 41/0356* (2013.01); *H02K 2211/03* (2013.01)

(58) Field of Classification Search
CPC . H02P 6/16; H02P 6/006; H02P 7/025; H02K 11/215; H02K 29/08; H02K 41/031; H02K 41/02; H02K 41/03
See application file for complete search history.

(56) References Cited

U.S. PATENT DOCUMENTS

| 5,854,460 A * | 12/1998 | Graf ....................... B23K 26/38 |
| | | 219/121.67 |
| 10,340,163 B2 * | 7/2019 | Seyama ............... H02K 41/031 |

(Continued)

FOREIGN PATENT DOCUMENTS

| JP | 05-284718 A | 10/1993 |
| JP | 2002-10617 A | 1/2002 |

(Continued)

OTHER PUBLICATIONS

T. Higuchi, "An Application of Linear Stepping Motor To Versatile Conveyor System". Institute of Industrial Science, University of Tokyo. IFAC Components and Instruments for Distributed Control Systems. Parris, France 1982.

(Continued)

*Primary Examiner* — Thai T Dinh
(74) *Attorney, Agent, or Firm* — Hauptman Ham, LLP (57) ABSTRACT

A linear motor according to an exemplary embodiment of the present invention includes a frame having a bottom and two sidewalls and extending in a longitudinal direction, multiple coil modules repeatedly disposed on the bottom in the longitudinal direction and configured to constitute a stator, a mover disposed on the two sidewalls in a width direction intersecting the longitudinal direction, the mover being movable in the longitudinal direction, thrust magnets mounted at a lower side of the mover and selectively corresponding to the multiple coil modules, and a Hall switching board mounted on an inner surface of one of the two sidewalls and having first Hall sensors (switching Hall sensors) operated by a magnetic field corresponding to the thrust magnets so that a driver controls phase conversion of the multiple coil modules.

10 Claims, 10 Drawing Sheets

(51) Int. Cl.
  *H02K 11/215* (2016.01)
  *H02K 41/03* (2006.01)
  *H02K 41/035* (2006.01)

(56) References Cited

U.S. PATENT DOCUMENTS

| | | | |
|---|---|---|---|
| 2001/0054851 A1* | 12/2001 | Tsuboi | H02K 41/031 310/12.19 |
| 2002/0047355 A1* | 4/2002 | Hwang | H02K 41/03 310/68 C |
| 2012/0057140 A1* | 3/2012 | Aoki | G03F 7/709 355/53 |
| 2013/0035784 A1 | 2/2013 | Wernersbach et al. | |
| 2014/0033854 A1* | 2/2014 | Hosaka | G03F 7/70716 74/490.09 |
| 2014/0331888 A1 | 11/2014 | Wernersbach et al. | |
| 2015/0008768 A1 | 1/2015 | Achterberg et al. | |
| 2017/0309503 A1* | 10/2017 | Seyama | H01L 21/67144 |
| 2019/0078950 A1* | 3/2019 | Huang | H02P 6/183 |
| 2019/0113854 A1* | 4/2019 | Miyakawa | G03F 7/70775 |

FOREIGN PATENT DOCUMENTS

| | | |
|---|---|---|
| JP | 2004-056892 A | 2/2004 |
| KR | 10-2006-0118669 A | 11/2006 |
| KR | 10-2014-0085587 A | 7/2014 |

OTHER PUBLICATIONS

[Supportive Materials for Exception to Loss of Novelty] Hyunchang Kim et al., Development of Moving Magnet Type Multi-mover Linear Transport System, International Symposium on Precision Engineering and Sustainable Manufacturing, Jul. 3, 2018-Jul. 7, 2018, Korean Society for Precision Engineering, Sapporo Convention Center, Japan.

* cited by examiner

LINEAR MOTOR AND LINEAR MOTOR CONTROL SYSTEM

CROSS-REFERENCE TO RELATED APPLICATION

This application claims priority to and the benefit of Korean Patent Application No. 10-2018-0140961 filed in the Korean Intellectual Property Office on Nov. 15, 2018, the entire contents of which are incorporated herein by reference.

BACKGROUND OF THE INVENTION

(a) Field of the Invention

The present invention relates to a linear motor and a linear motor control system, and more particularly, to a linear motor that does not require a controlling cable at a mover configured to move on a stator provided on a frame, and a linear motor control system.

(b) Description of the Related Art

In general, as a device enabling a working robot or the like to precisely move reciprocally, a linear motor is widely used in various fields. The linear motor may obtain rectilinear force directly in response to an electrical input and thus not require a separate power conversion device for converting a rotational motion into a rectilinear motion. In addition, the linear motor rectilinearly moves in a contactless movement manner, thereby enabling a high-speed operation and a constant-speed operation and implementing a downsized system.

For example, the linear motor includes a rectilinearly formed frame, stator magnets repeatedly provided in a longitudinal direction of the frame, guide rails disposed at lateral sides of the stator magnets and provided in the longitudinal direction of the frame, a block disposed on the guide rails, a mover supported on the block, and mover coil modules mounted on the mover and disposed selectively corresponding to the stator magnets. The mover coil modules are connected through a cable. Because the linear motor has the cable used to control the mover coil modules, a movement distance or a movement pattern of the mover on the frame are restricted.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a linear motor that does not require a controlling cable at a mover configured to move on a stator provided on a frame. The present invention has also been made in an effort to provide a linear motor control system configured to precisely control the linear motor.

An exemplary embodiment of the present invention provides a linear motor including a frame having a bottom and two sidewalls and extending in a longitudinal direction, multiple coil modules repeatedly disposed on the bottom in the longitudinal direction and configured to constitute a stator, a mover disposed on the two sidewalls in a width direction intersecting the longitudinal direction, the mover being movable in the longitudinal direction, thrust magnets mounted at a lower side of the mover and selectively corresponding to the multiple coil modules, and a Hall switching board mounted on an inner surface of one of the two sidewalls and having first Hall sensors (switching Hall sensors) operated by a magnetic field corresponding to the thrust magnets so that a driver controls phase conversion of the multiple coil modules.

The linear motor according to the exemplary embodiment of the present invention may further include guide rails provided on the two sidewalls and disposed in the longitudinal direction, and a block disposed on the guide rail and configured to slide, and the mover may be supported on the block.

The linear motor according to the exemplary embodiment of the present invention may further include an absolute position measurement board having second Hall sensors (linear Hall sensors) provided on the two sidewalls and position measurement magnets mounted at the lower side of the mover and configured to produce a magnetic field corresponding to the second Hall sensors. The absolute position measurement board may be provided at a lateral side of the guide rail.

The mover may further have outer walls facing outer surfaces of the two sidewalls at both ends in the width direction, an encoder head may be provided on the outer surface of one of the two sidewalls, and an encoder scale facing the encoder head may be provided on the outer wall.

Corresponding to a unit coil module pitch Pt set between the three coil modules disposed in the longitudinal direction, the two thrust magnets having the same size may be formed in the longitudinal direction, and a pitch Pm between the two adjacent thrust magnets may be set as ½ of the coil module pitch Pt (Pm=Pt/2).

A first pitch P1 between the first Hall sensors provided on the Hall switching board may be set as ⅓ of the unit coil module pitch Pt (P1=Pt/3).

The two position measurement magnets having the same size may be provided in the longitudinal direction, and a pitch Pp between the two adjacent position measurement magnets may be set as ⅓ of the unit coil module pitch Pt (Pp=Pt/3).

A second pitch P2 between the second Hall sensors provided on the absolute position measurement board may be set as ⅓ of the unit coil module pitch Pt (P2=Pt/3).

Corresponding to a unit coil module pitch Pt set between the three coil modules disposed in the longitudinal direction, the thrust magnets may include a first magnet having a first length in the longitudinal direction, and second and third magnets each having a second length which is ½ of the first length, and a pitch Pm2 between the two adjacent thrust magnets may be set as ½ of the unit coil module pitch Pt (Pm2=Pt/2).

The position measurement magnets may include a first position magnet having a first length in the longitudinal direction, and second and third position magnets having a second length which is ½ of the first length, and a pitch Pp2 of the two adjacent position measurement magnets may be set as ⅓ of the unit coil module pitch Pt (Pp2=Pt/3).

A twenty-second pitch P22 between the second Hall sensors provided on the absolute position measurement board may be set as ⅓ of the unit coil module pitch Pt (P22=Pt/3).

Another exemplary embodiment of the present invention provides a linear motor control system including multiple coil modules configured to constitute a stator, a driver configured to operate the coil modules, a first Hall sensor configured to input a switching signal to the driver to generate a phase conversion signal for the coil module with a magnetic field set by an interaction with a thrust magnet provided on a mover, an encoder provided in a partial section between the stator and the mover and configured to generate an encoder signal to switch the coil modules through feedback control, a second Hall sensor configured to generate a position signal for the mover with a magnetic field set by an interaction with a position measurement magnet provided on the mover, and a control unit configured to apply the encoder signal and the position signal to the driver, in which the driver controls the coil modules based on a signal applied from the control unit and the switching signal applied from the first Hall sensor.

In the exemplary embodiment of the present invention as described above, the coil modules configured to constitute the stator are installed on the frame, the thrust magnets selectively corresponding to the coil modules are installed on the mover, the Hall switching board having the first Hall sensor (switching Hall sensor) is mounted on the frame, and the driver may control the phase conversion of the coil modules based on the value of the magnetic field of the first Hall sensor corresponding to the thrust magnet, such that it is possible to remove the controlling cable from the mover configured to move on the frame and the stator.

DETAILED DESCRIPTION OF THE EMBODIMENTS

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
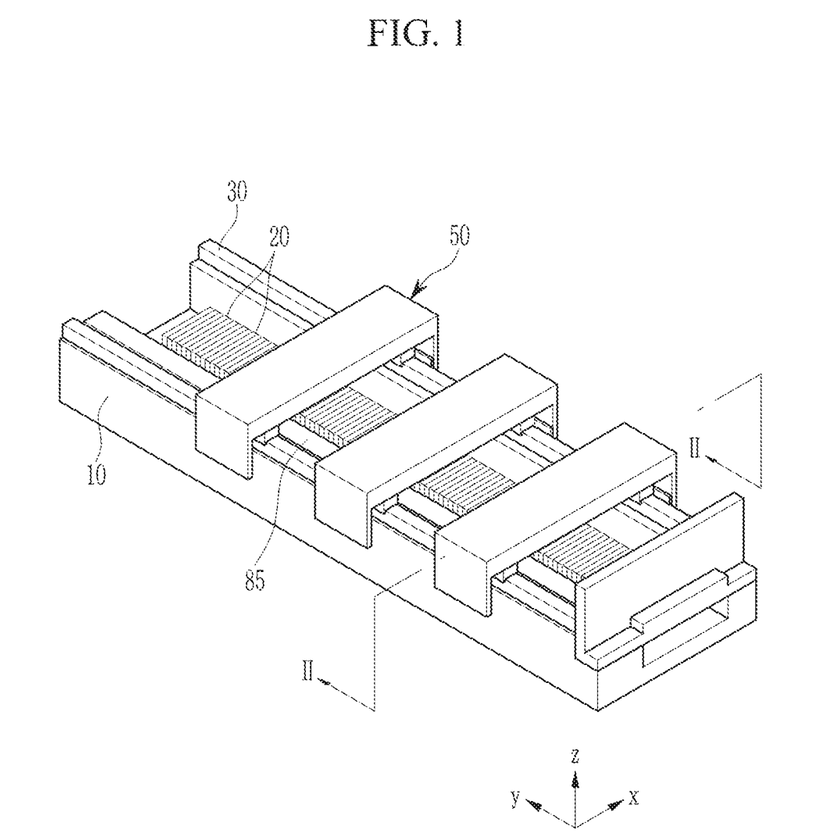
FIG. 1 is a perspective view of a linear motor according to an exemplary embodiment of the present invention.
Figure 2:
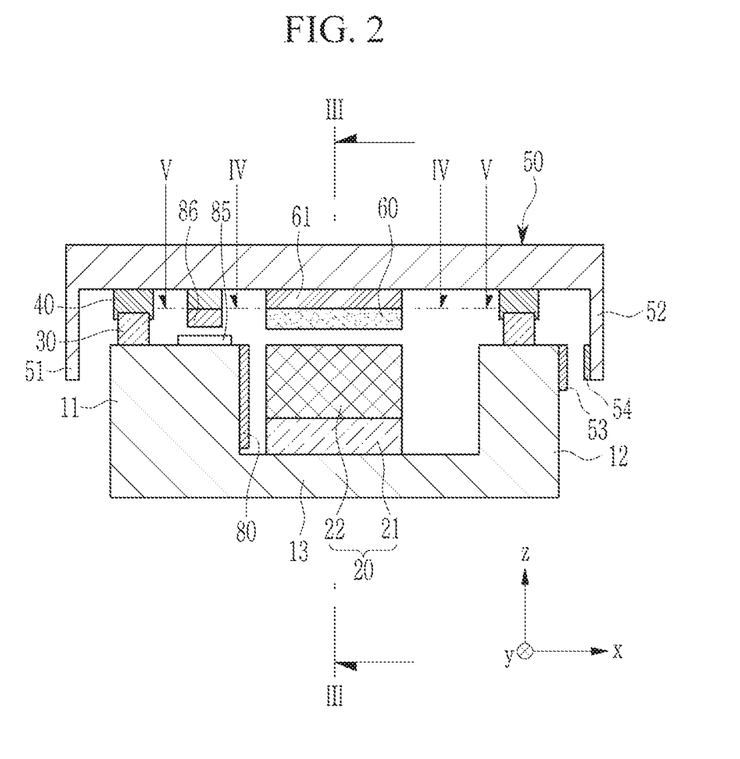
FIG. 2 is a cross-sectional view taken along line II-II in FIG. 1.
Figure 3:
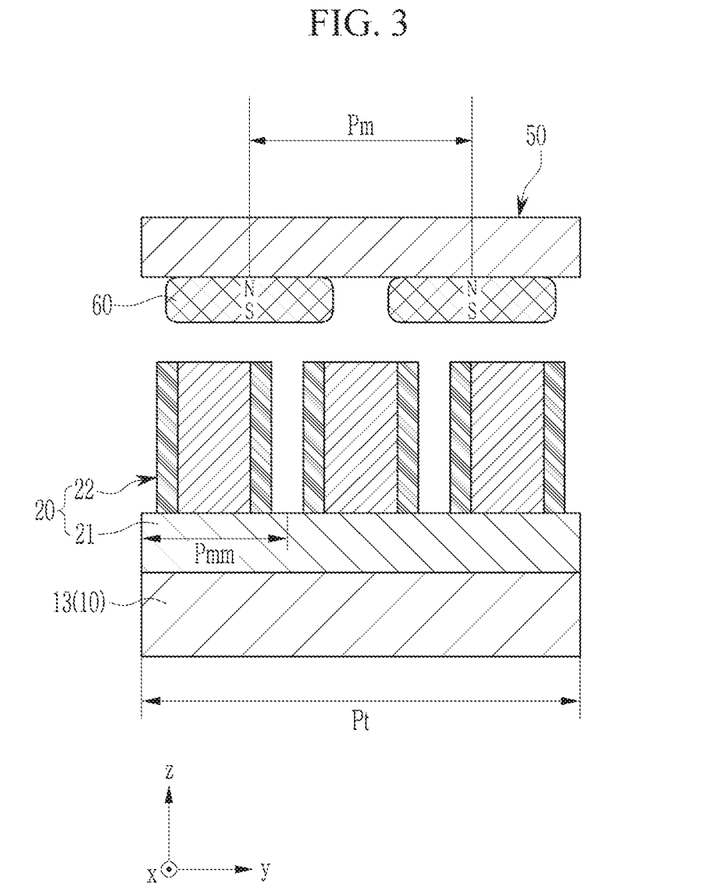
FIG. 3 is a cross-sectional view taken along line III-III in FIG. 2.

FIG. 1 is a perspective view of a linear motor according to an exemplary embodiment of the present invention, FIG. 2 is a cross-sectional view taken along line II-II in FIG. 1, and FIG. 3 is a cross-sectional view taken along line III-III in FIG. 2. Referring to FIGS. 1 to 3, a linear motor according to an exemplary embodiment includes a frame 10, coil modules 20 for constituting a stator, guide rails 30, a block 40, a mover 50, thrust magnets 60, a driver 70 (see FIG. 7 or the like), and a Hall switching board 80 having switching Hall sensors (first Hall sensors) S1 (see FIG. 4 or the like).

That is, in the linear motor according to the exemplary embodiment, the coil modules 20 constitute the stator, and the thrust magnets 60 constitute the mover 50, thereby enabling the motion of the mover 50 without a controlling cable (not illustrated).

The frame 10 has a bottom 13 and two sidewalls 11 and 12 and extends in a longitudinal direction (y-axis direction). The bottom 13 is disposed at a middle portion in a width direction (x-axis direction) intersecting the longitudinal direction (y-axis direction), and the two sidewalls 11 and 12 extend at both ends of the bottom 13 in the y-axis direction while having a predetermined height in a height direction (z-axis direction).

The coil modules 20 are repeatedly disposed in the longitudinal direction (y-axis direction) on the bottom 13 and constitute the stator. That is, the three coil modules 20 are operated with three-phase alternating current and constitute one unit (one part), and the coil modules 20 are repeatedly disposed in a range in the longitudinal direction (y-axis direction).

The coil module 20 includes a coil yoke 21 installed on the bottom 13, and a coil 22 wound around the coil yoke 21. Three-phase conversion of the coil modules 20 is performed by the three-phase alternating current applied to the coils 22, such that a magnetic field is formed on and eliminated from the coil yoke 21.

Figure 7:
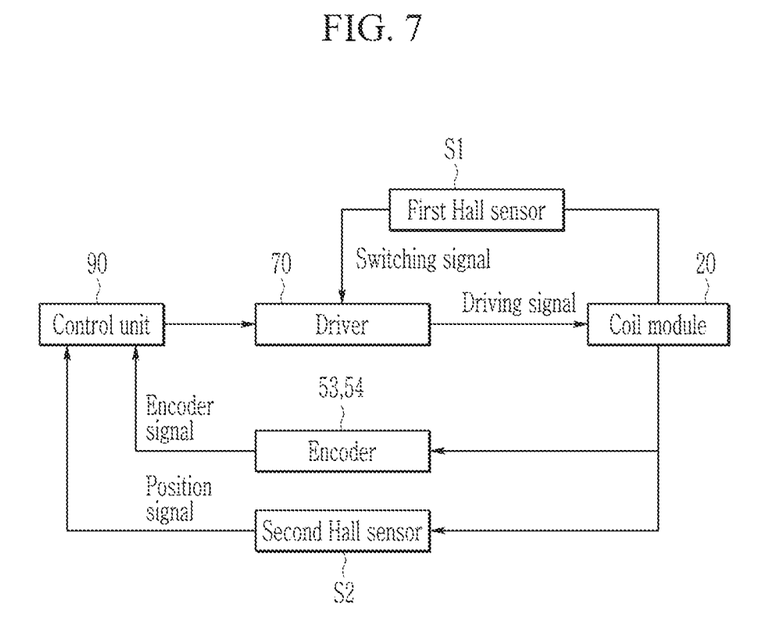
FIG. 7 is a configuration view of a linear motor control system having an encoder (an encoder scale and an encoder head) according to the exemplary embodiment of the present invention.

The driver 70 is configured to control the coil modules 20 in a three-phase conversion manner and electrically connected to the coils 22 of the respective coil modules 20. One part of the coil modules 20 including the three coils 22 is operated by one driver 70.

For example, if the four parts of the three-phase coil modules 20 are provided, the four drivers 70 are required to operate the coil modules 20. A length of the linear motor may be increased as the number of coil modules 20 and the number of drivers 70 are increased.

Although not illustrated, the driver 70 is installed on the frame 10. The coil module 20 selected based on a driving signal from the driver 70 forms or eliminates an N-pole or S-pole magnetic field.

The guide rails 30 are provided on the two sidewalls 11 and 12 in the longitudinal direction (y-axis direction), The block 40 is disposed on the guide rails 30. The mover 50 is supported on the block 40 and disposed on the two sidewalls 11 and 12 in the width direction (x-axis direction), and the mover 50 slides in the longitudinal direction (y-axis direction).

The thrust magnet 60 is mounted at a lower side of the mover 50 and selectively corresponds to the coil module 20. The thrust magnet 60 moves the mover 50 on the frame 10 while interacting with the magnetic field formed or eliminated by the three-phase conversion of the coil modules 20. The thrust magnet 60 is installed on a lower surface of the mover 50 with a magnet yoke 61 interposed therebetween.

In order to operate the coil modules 20 with the driver 70, the positions of the mover 50 and the thrust magnet 60 need to be recognized, and the driver 70 needs to accurately perform the three-phase conversion in accordance with the positions of the mover 50 and the thrust magnet 60.

Figure 4:
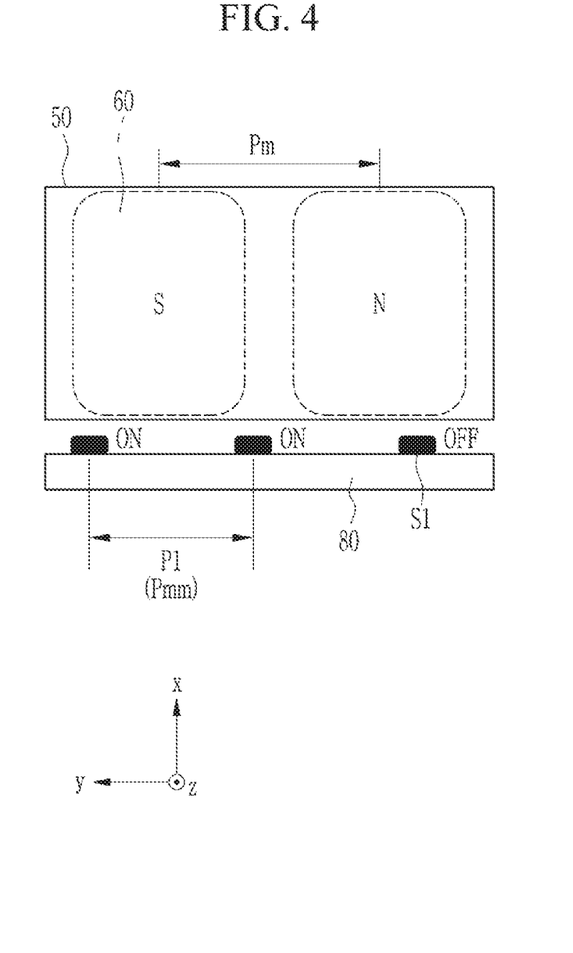
FIG. 4 is a cross-sectional view taken along line IV-IV in FIG. 2 and illustrates a relationship between a thrust magnet and a switching Hall sensor (first Hall sensor).

The Hall switching board 80 is mounted on an inner surface of one sidewall 11 of the two sidewalls 11 and 12 and has first Hall sensors (switching Hall sensors) S1. The switching Hall sensors S1 are operated by the magnetic field corresponding to the arrangement of the switching Hall sensors S1 and the thrust magnets 60 of the mover 50, thereby producing a three-phase conversion signal for the driver 70. The three-phase conversion signal is transmitted to the driver 70 to control the coils 22 of the coil modules 20.

That is, the three-phase conversion signal converts the phase of the driver 70 so that the coil modules 20 are operated with the accurate phase in accordance with the positions of the mover 50 and the thrust magnet 60. The linear motor is operated when the positions of the mover 50 and the thrust magnet 60 match with the phase conversion of the driver 70. The driver 70 is configured to be two-phase converted over an entire region by using a logic circuit.

In addition, the exemplary embodiment further includes absolute position measurement boards 85 and position measurement magnets 86. The absolute position measurement board 85 has second Hall sensors (linear Hall sensors) S2 (see FIG. 7) provided on the two sidewalls 11 and 12 at lateral sides of the guide rails 30.

The second Hall sensor S2 is operated by the magnetic field corresponding to the position measurement magnet 86. That is, the position measurement magnet 86 is mounted at a lower side of the mover 50 and produces the magnetic field corresponding to the second Hall sensor S20, The second Hall sensors S2 are operated by the magnetic field corresponding to the arrangement of the second Hall sensors S2 and the position measurement magnet 86 of the mover 50, and estimate the positions of the mover 50 and the position measurement magnet 86 by using voltage signals of the second Hall sensors S2 that vary depending on the position of the position measurement magnet 86 of the mover 50.

The second Hall sensor S2 indicates a change in magnetic field as a voltage signal, and the voltage signal is used as a feedback signal for position control. A control unit 90 (see FIG. 7) controls the positions of the mover 50 and the position measurement magnet 86 by using the feedback signal.

The driver 70, the Hall switching board 80, and the absolute position measurement board 85 are installed on the frame 10 and connected to a controlling cable (not illustrated), and the mover 50 has the thrust magnet 60 and the position measurement magnet 86, such that no controlling cable is connected to the mover 50.

An encoder (an encoder head 53 and an encoder scale 54) is further provided between the mover 50 and the frame 10. At both ends in the width direction (x-axis direction), the mover 50 has two outer walls 51 and 52 facing outer surfaces of the two sidewalls 11 and 12.

Figure 6:
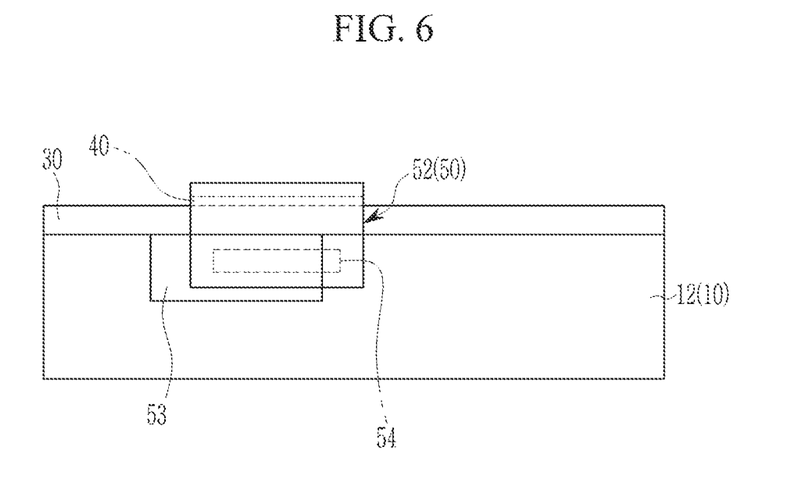
FIG. 6 is a right side view of FIG. 2 of the present invention.

The encoder head 53 is provided on the outer surface of one sidewall 12. The encoder scale 54 is provided on one outer wall 52 of the mover 50 and faces the encoder head 53 at an interval, such that the mover 50 may be precisely controlled. Therefore, no controlling cable may be connected to the mover 50.

Referring to FIGS. 2 and 3, the three coil modules 20 disposed in the longitudinal direction (y-axis direction) define a unit coil module pitch Pt. Therefore, a coil module pitch Pmm between the adjacent coil modules 20 is set as ⅓ of the unit coil module pitch Pt (Pmm=Pt/3).

Corresponding to the unit coil module pitch Pt, the two thrust magnets 60 having the same size are formed in the longitudinal direction (y-axis direction). A pitch Pm between the two adjacent thrust magnets is set as ½ of the unit coil module pitch Pt (Pm=Pt/2).

The two thrust magnets 60 are disposed with respect to the unit coil module pitch Pt including the three coil modules 20. The two thrust magnets 60 have different polarities toward the coil modules 20.

That is, in FIG. 3, the left thrust magnet 60 has the S-polarity toward the coil module 20, and the right thrust magnet 60 has the N-polarity toward the coil module 20. Therefore, the adjacent coil modules 20 are phase-converted and interact with the S-polarity and the N-polarity of the thrust magnets 60.

With the three-phase conversion of the coil modules 20, attractive force and repulsive force are produced and eliminated between the coil modules 20 and the thrust magnets 60, such that the mover 50 mounted with the thrust magnets 60 moves on the frame 10 in the longitudinal direction (y-axis direction).

The unit coil module pitch Pt may be variously set in accordance with the purpose of the linear motor, and the shapes and the arrangements of the thrust magnets 60 with respect to the coil modules 20 and the unit coil module pitch Pt may be modified in consideration of thrust, force ripple, and the like.

FIG. 4 is a cross-sectional view taken along line IV-IV in FIG. 2 and illustrates a relationship between the thrust magnet and the switching Hall sensor (first Hall sensor). Referring to FIGS. 2 to 4, a first pitch P1 between the first Hall sensors S1 provided on the Hall switching board 80 is set as ⅓ of the unit coil module pitch Pt (P1=Pt/3). That is, the first pitch P1 between the first Hall sensors S1 is equal to the coil module pitch Pmm set between the adjacent coil modules 20 (P1=Pmm).

The first Hall sensor S1 is switched in accordance with the interaction with the thrust magnet 60. The first Hall sensor S1 is turned on when intensity of the magnetic field is equal to or higher than a set value, and turned off when intensity of the magnetic field is lower than the set value. The first Hall sensor S1 provides a signal so that the driver 70 controls the three-phase conversion of the coil modules 20.

In this case, since the first pitch P1 between the first Hall sensors S1 is equal to the coil module pitch Pmm (P1=Pmm), the first Hall sensor S1 interacts with the thrust magnet 60 and is turned on or off by the magnetic field applied between the first Hall sensor S1 and the thrust magnet 60. Therefore, it is possible to remove the Hall switching magnet in the related art that produces a magnetic field while interacting with a Hall sensor.

Since the magnetic field with the first Hall sensor S1 varies depending on the arrangement of the thrust magnets 60, the first Hall sensor S1 is switched in accordance with the arrangement of the thrust magnets 60. The driver 70 controls the three-phase conversion of the coil modules 20 based on the switching signal from the first Hall sensor S1.

Figure 5:
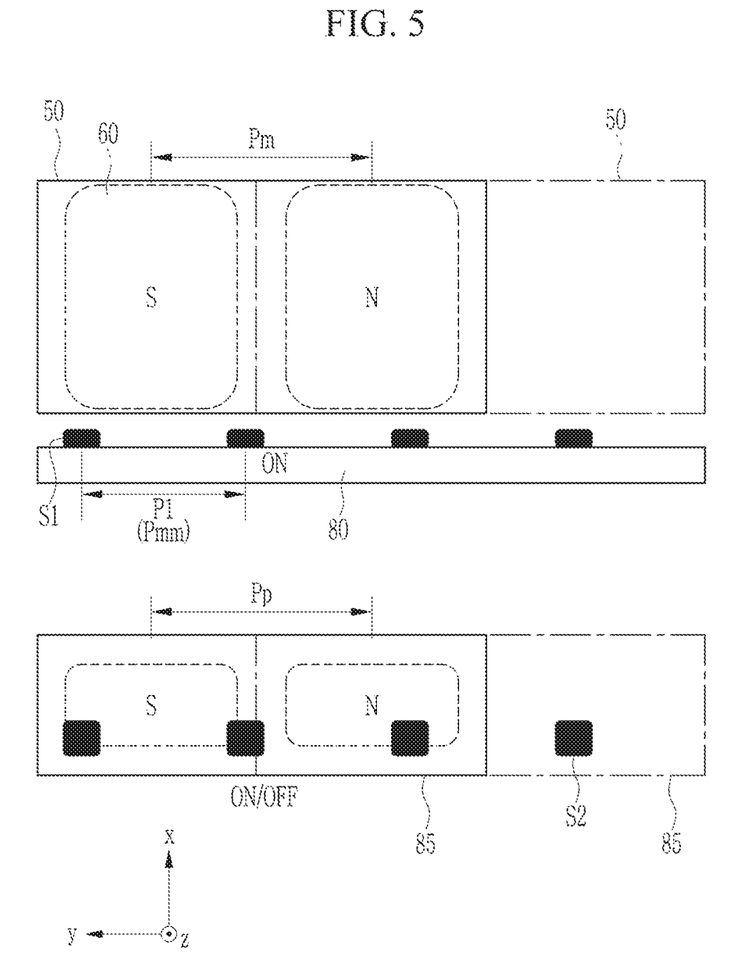
FIG. 5 is a cross-sectional view taken along line V-V in FIG. 2 and illustrates a relationship between the switching Hall sensor (first Hall sensor) and a linear Hall sensor (second Hall sensor).

FIG. 5 is a cross-sectional view taken along line V-V in FIG. 2 and illustrates a relationship between the switching Hall sensor (first Hall sensor) and the linear Hall sensor (second Hall sensor). Referring to FIGS. 2 to 5, it is possible to acquire an absolute position signal for the mover 50 by combining an on or off signal for the first Hall sensor S1 and an on or off signal for the second Hall sensor S2.

The two position measurement magnets 86 having the same size are formed in the longitudinal direction (y-axis direction), and a pitch Pp between the two adjacent position measurement magnets 86 is set as ⅓ of the unit coil module pitch Pt (Pp=Pt/3).

A second pitch P2 between the second Hall sensors S2 provided on the absolute position measurement boards 85 is set as ⅓ of the unit coil module pitch Pt (P2=Pt/3). That is, the second pitch P2 between the second Hall sensors S2 is equal to the coil module pitch Pmm set between the adjacent coil modules 20 (P2=Pmm). The first and second Hall sensors S1 and S2 match with each other.

The second Hall sensor S2 linearly converts a value of the magnetic field, interacting with the position measurement magnet 86, into a voltage signal. That is, as the mover 50 moves (from the state indicated by the solid line to the state indicated by the alternate-long-and-two-short-dash line or from the state indicated by the alternate-long-and-two-short-dash line to the state indicated by the solid line in FIG. 5), the voltage signal of the second Hall sensor S2 provided on the absolute position measurement board 85 installed on the frame 10 is changed by the position measurement magnet 86 mounted on the mover 50. The control unit 90 (see FIG. 7), separately provided, acquires position information by using the changed voltage signal.

The second pitch P2 between the second Hall sensors S2 is equal to the coil module pitch Pmm (P2=Pmm), and the on or off signals for the matched first and second Hall sensors S1 and S2 are used, such that the magnetic field may be used only for a desired region. Further, absolute position information may be acquired by converting a value of the magnetic field into a voltage signal.

For example, the second pitch P2 between the second Hall sensors S2 may be used by being divided into the thrust magnet pitch (Pm=Pt/2) set as ½ of the unit coil module pitch Pt. Therefore, a direction cannot be recognized out of the region of the second pitch P2 between the second Hall sensors S2, and a separate signal is further required to recognize the direction.

That is, the second Hall sensor S2 is limited in position precision due to measurable intensity of the magnetic field, distortion of the magnetic field, voltage noise component, and the like. The multiple second Hall sensors S2 need to be disposed within a short distance to acquire high precision.

FIG. 6 is a right side view of FIG. 2 of the present invention. Referring to FIGS. 2 and 6, the encoder (the encoder head 53 and the encoder scale 54) may reduce the number of second Hall sensors S2, simplify input and output devices of the control unit 90 for connecting the encoder and the driver 70, and improve position precision. That is, the encoder head 53 and the encoder scale 54 may compensate for the shortcoming of the second Hall sensor S2.

As an example, the linear encoder scale 54 is installed on the mover 50, and the encoder head 53 is attached in a particular section of the frame 10 where precise control is required. Therefore, during feedback control using the second Hall sensor S2 in the particular section, the switching is performed by the feedback control using the encoder head 53 and the encoder scale 54, such that precise position control may be performed.

Since the encoder scale 54 is attached to the mover 50, the controlling cable may be removed from the mover 50. The encoder implements a control section with high precision that cannot be implemented only by the second Hall sensor S2. Therefore, the exemplary embodiment may be effectively applied to a section of an in-line system where the precise position control of the mover 50, such as precise chip mounting and precise processing, is required.

FIG. 7 is a configuration view of a linear motor control system having the encoder (the encoder scale and the encoder head) according to the exemplary embodiment of the present invention. Referring to FIG. 7, the linear motor control system includes the coil modules 20 configured to constitute the stator, the driver 70 configured to operate the coil modules 20, the first Hall sensor S1 configured to input a switching signal to the driver 70, the encoders 53 and 54 configured to generate an encoder signal, the second Hall sensor S2 configured to generate a position signal, and the control unit 90 configured to apply the encoder signal and the position signal to the driver 70.

The linear motor control system uses a linear Hall sensor as the second Hall sensor S2, which serves as an absolute position sensor, to perform the basic position control and the operation, and uses the encoder to switch the feedback signal in a section where the precise control is required, thereby performing the position control with high precision.

Figure 8:
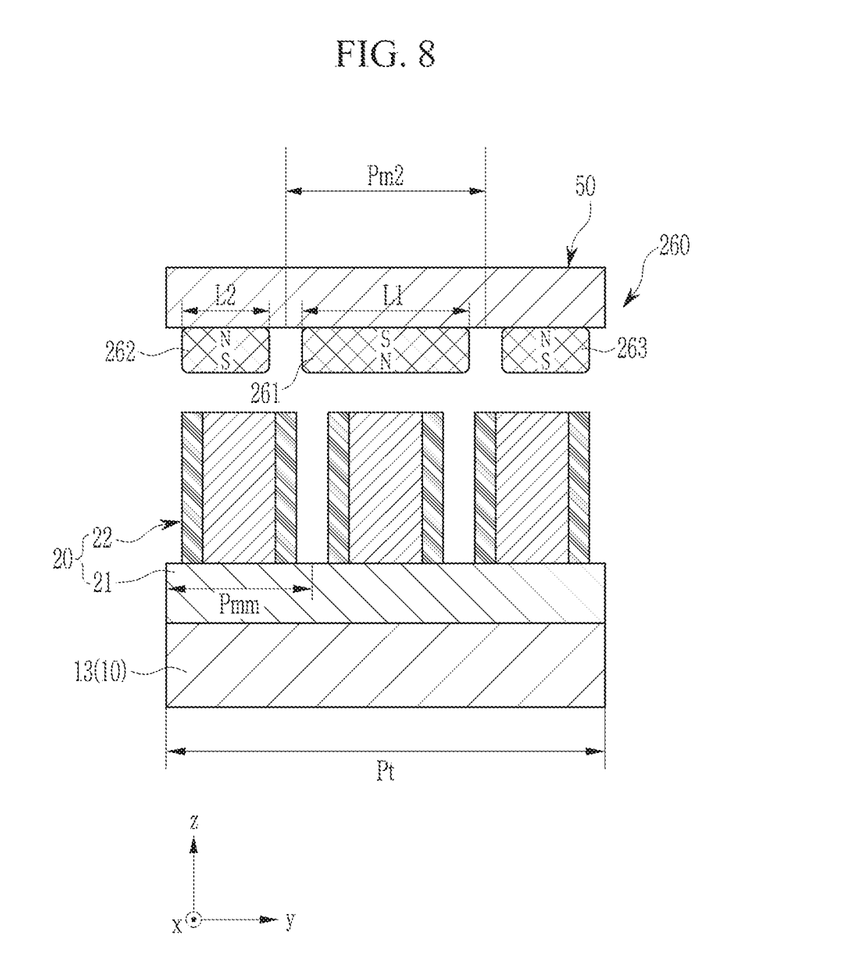
FIG. 8 is a cross-sectional view of a modified example according to the exemplary embodiment of the present invention and illustrating an arrangement relationship between a coil module and the thrust magnet.

Hereinafter, a modified example according to the exemplary embodiment of the present invention will be described. FIG. 8 is a cross-sectional view of a modified example according to the exemplary embodiment of the present invention and illustrating an arrangement relationship between the coil module and the thrust magnet, FIG. 9 is a top plan view of a modified example according to the exemplary embodiment of the present invention and illustrating a relationship between the thrust magnet and the switching Hall sensor (first Hall sensor), and FIG. 10 is a top plan view of a modified example according to the exemplary embodiment of the present invention and illustrating a relationship between the switching Hall sensor (first Hall sensor) and the linear Hall sensor (second Hall sensor).

Figure 9:
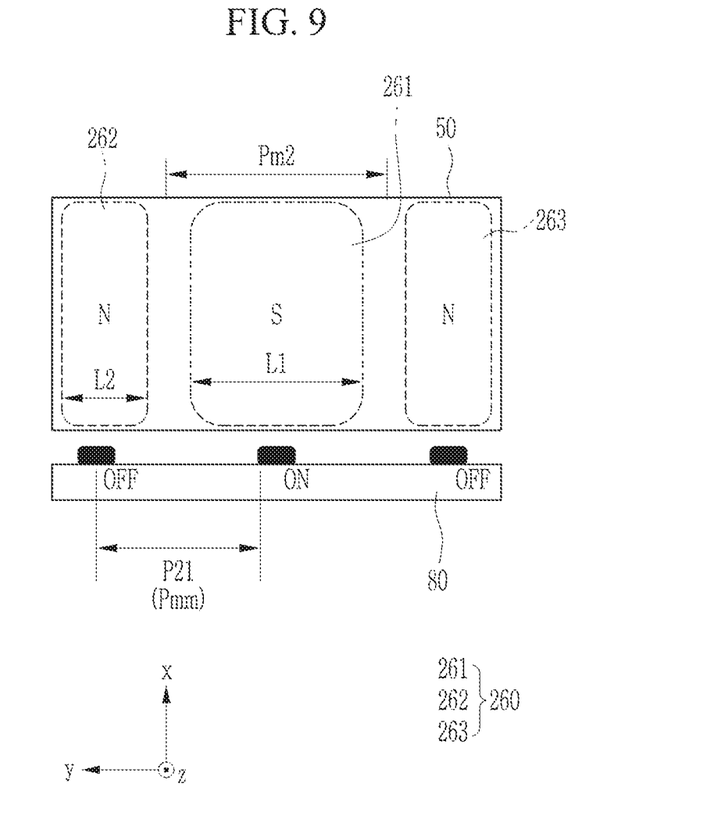
FIG. 9 is a top plan view of a modified example according to the exemplary embodiment of the present invention and illustrating a relationship between the thrust magnet and the switching Hall sensor (first Hall sensor).
Figure 10:
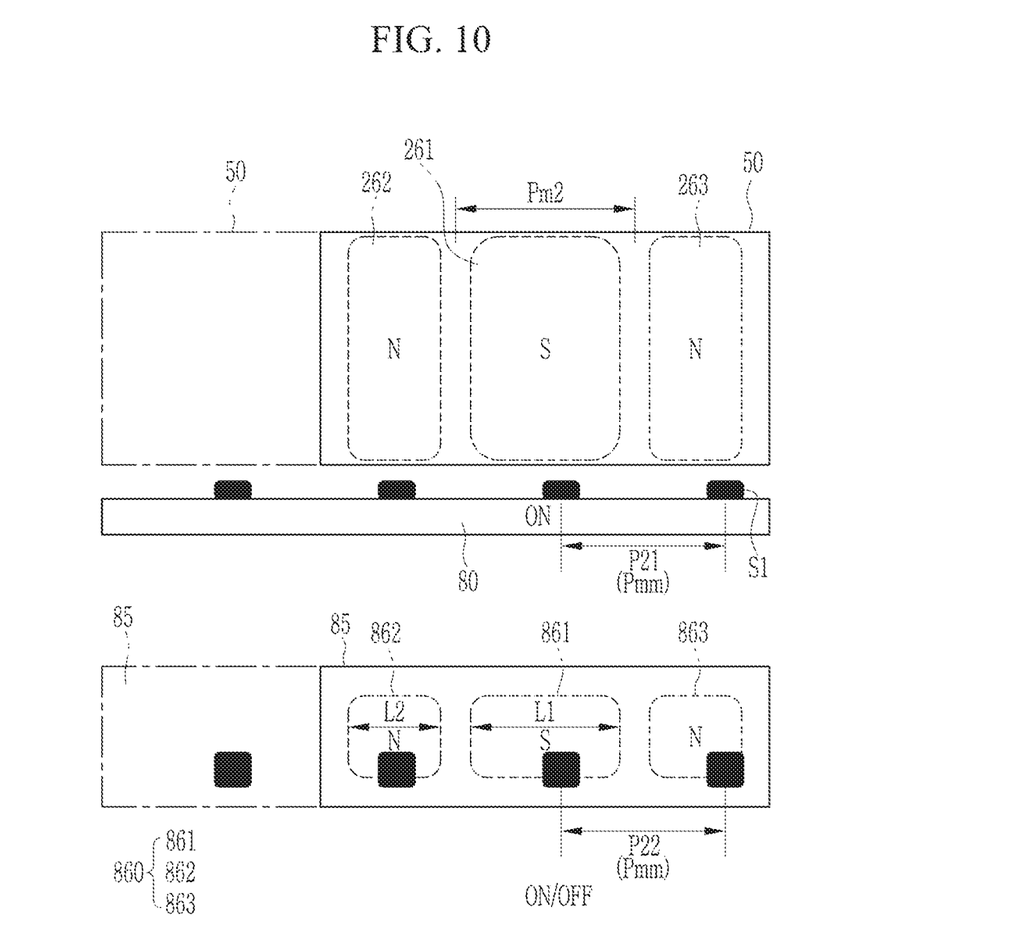
FIG. 10 is a top plan view of a modified example according to the exemplary embodiment of the present invention and illustrating a relationship between the switching Hall sensor (first Hall sensor) and the linear Hall sensor (second Hall sensor).

Referring to FIGS. 8 to 10, the three coil modules 20 disposed in the longitudinal direction (y-axis direction) define the unit coil module pitch Pt. Therefore, the coil module pitch Pmm between the adjacent coil modules 20 is set as ⅓ of the unit coil module pitch Pt (Pmm=Pt/3).

Corresponding to the unit coil module pitch Pt, thrust magnets 260 include a first magnet 261 having a first length L1 in the longitudinal direction (y-axis direction), and second and third magnets 262 and 263 each having a second length L2 which is ½ of the first length L1. Therefore, a pitch Pm2 between the two adjacent thrust magnets 261 and 262 or 261 and 263 is set as ½ of the unit coil module pitch Pt (Pm2=Pt/2).

The three thrust magnets 260 are disposed with respect to the unit coil module pitch Pt including the three coil modules 20. The three thrust magnets 260 have different polarities toward the coil modules 20.

That is, in FIG. 8, the left second magnet 262 has the S-polarity toward the coil module 20, the intermediate second magnet 261 has the N-polarity toward the coil module 20, and the right third magnet 263 has the S-polarity toward the coil module 20. Therefore, the polarities of the adjacent coil modules 20 are controlled and interact with the S-polarity and the N-polarity of the thrust magnets 262, 261, and 263.

With the three-phase conversion of the coil modules 20, attractive force and repulsive force are produced and eliminated between the coil modules 20 and the thrust magnets 260, such that the mover 50 mounted with the thrust magnets 260 moves on the frame 10 in the longitudinal direction (y-axis direction) (from the state indicated by the alternate-long-and-two-short-dash line to the state indicated by the solid line or from the state indicated by the solid line to the state indicated by the alternate-long-and-two-short-dash line in FIG. 10).

A twenty-first pitch P21 between the first Hall sensors S1 provided on the Hall switching board 80 is set as ⅓ of the unit coil module pitch Pt (P21=Pt/3). That is, the twenty-first pitch P21 between the first Hall sensors S1 is equal to the coil module pitch Pmm set between the adjacent coil modules 20 (P21=Pmm).

The first Hall sensor S1 provides a signal so that the driver 70 controls the three-phase conversion of the coil modules 20. In this case, since the twenty-first pitch P21 between the first Hall sensors S1 is equal to the coil module pitch Pmm (P21=Pmm), the first Hall sensor S1 interacts with the thrust magnet 260 and is turned on or off by the magnetic field applied between the first Hall sensor S1 and the thrust magnet 260. Therefore, it is possible to remove the Hall switching magnet in the related art that produces a magnetic field while interacting with a Hall sensor.

Since the magnetic field with the first Hall sensor S1 varies depending on the arrangement of the thrust magnets 260, the first Hall sensor S1 is switched in accordance with the arrangement of the thrust magnets 260. The driver 70 controls the three-phase conversion of the coil modules 20 based on the switching signal from the first Hall sensor S1.

It is possible to acquire an absolute position signal for the mover 50 by combining an on or off signal for the first Hall sensor S1 and an on or off signal for the second Hall sensor S2.

Position measurement magnets 860 include a first position magnet 861 having a first length L1 in the longitudinal direction (y-axis direction), and second and third position magnets 862 and 863 each having a second length L2 which is ½ of the first length L1. A pitch Pp2 between the two adjacent position measurement magnets 860 is set as ⅓ of the unit coil module pitch Pt (Pp2=Pt/3).

A twenty-second pitch P22 between the second Hall sensors S2 provided on the absolute position measurement boards 85 is set as ⅓ of the unit coil module pitch Pt (P22=Pt/3). That is, the twenty-second pitch P22 between the second Hall sensors S2 is equal to the coil module pitch Pmm set between the adjacent coil modules 20 (P2=Pmm). The first and second Hall sensors S1 and S2 match with each other.

The second Hall sensor S2 linearly converts a value of the magnetic field, interacting with the position measurement magnet 860, into a voltage signal. That is, as the mover 50 moves, the voltage signal of the second sensor S2 provided on the absolute position measurement board 85 installed on the frame 10 is changed by the position measurement magnet 860 mounted on the mover 50. The control unit 90 (see FIG. 8), separately provided, acquires position information by using the changed signal.

The twenty-second pitch P22 between the second Hall sensors S2 is equal to the coil module pitch Pmm (P2=Pmm), and the on or off signals for the matched first and second Hall sensors S1 and S2 are used, such that the magnetic field may be used only for a desired region. Further, absolute position information may be acquired by converting a value of the magnetic field into a voltage signal.

For example, the twenty-second pitch P22 between the second Hall sensors S2 may be used by being divided into the thrust magnet pitch (Pm=Pt/2) set as ½ of the unit coil module pitch Pt. Therefore, a direction cannot be recognized out of the region of the twenty-second pitch P22 between the second Hall sensors S2, and a separate signal is further required to recognize the direction.

Meanwhile, as illustrated in FIG. 1, the linear motor rectilinearly extending in the y-axis direction has been exemplarily described above, but the present invention is not limited thereto, and a linear motor according to another exemplary embodiment of the present invention may be configured in the form of a closed loop. The linear motor in the form of a closed loop may have a structure in which a rectilinear portion extending rectilinearly and a curved portion extending in a curved shape (e.g., an arc shape) are connected to each other.

While the exemplary embodiments of the present invention have been described above, the present invention is not limited thereto, and various modifications can be made and carried out within the scope of the claims, the detailed description of the invention, and the accompanying drawings, and also fall within the scope of the invention.

<Description of symbols>

| | |
|---|---|
| 10: Frame | 11, 12: Sidewall |
| 13: Bottom | 20: Coil module |
| 21: Coil yoke | 22: Coil |
| 30: Guide rail | 40: Block |
| 50: Mover | 51, 52: Outer wall |
| 53: Encoder head | 54: Encoder scale |
| 60: Thrust magnet | 61: Magnet yoke |
| 70: Driver | 80: Hall switching board |
| 85: Absolute position measurement board | |
| 86, 860: Position measurement magnet | |
| 90: Control unit | 260: Thrust magnet |
| 261: First magnet | 262: Second magnet |
| 263: Third magnet | 861: First position magnet |
| 862: Second position magnet | 863: Third position magnet |
| L1, L2: First and second lengths | |
| P1, P21: First and twenty-first pitches | |
| P2, P22: Second and twenty-second pitches | |
| Pm, Pm2: Pitch between thrust magnets | |
| Pmm: Coil module pitch | |
| Pp, Pp2: Pitch between position measurement magnets | |
| Pt: Unit coil module pitch | |
| S1: First Hall sensor (switching Hall sensor) | |
| S2: Second Hall sensor (Linear Hail sensor) | |

What is claimed is:

1. A linear motor comprising:
   a frame having a bottom and two sidewalls and extending in a longitudinal direction;
   multiple coil modules repeatedly disposed on the bottom in the longitudinal direction and configured to constitute a stator;
   a mover disposed on the two sidewalls in a width direction intersecting the longitudinal direction, the mover being movable in the longitudinal direction;
   thrust magnets mounted at a lower side of the mover and selectively corresponding to the multiple coil modules;
   a Hall switching board mounted on an inner surface of one of the two sidewalls and having first Hall sensors operated by a magnetic field corresponding to the thrust magnets so that a driver controls phase conversion of the multiple coil modules;
   an absolute position measurement board having second Hall sensors provided on one of the two sidewalls; and
   position measurement magnets mounted at the lower side of the mover and configured to produce a magnetic field corresponding to the second Hall sensors, wherein:
corresponding to a unit coil module pitch Pt set between three coil modules of the multiple coil modules disposed in the longitudinal direction, two adjacent thrust magnets of the thrust magnets having the same size are formed in the longitudinal direction, and a pitch Pm between the two adjacent thrust magnets is set as ½ of the unit coil module pitch Pt (Pm=Pt/2).

2. The linear motor of claim 1, wherein:
the mover has outer walls facing outer surfaces of the two sidewalls at both ends in the width direction,
an encoder head is provided on the outer surface of one of the two sidewalls, and
an encoder scale facing the encoder head is provided on one of the outer walls.

3. The linear motor of claim 1, wherein:
a first pitch P1 between the first Hall sensors provided on the Hall switching board is set as ⅓ of the unit coil module pitch Pt (P1=Pt/3).

4. The linear motor of claim 3, wherein:
the two position measurement magnets having the same size are provided in the longitudinal direction, and a pitch Pp between the two adjacent position measurement magnets is set as ⅓ of the unit coil module pitch Pt (Pp=Pt/3).

5. The linear motor of claim 4, wherein:
a second pitch P2 between the second Hall sensors provided on the absolute position measurement board is set as ⅓ of the unit coil module pitch Pt (P2=Pt/3).

6. A linear motor comprising:
a frame having a bottom and two sidewalls and extending in a longitudinal direction;
multiple coil modules repeatedly disposed on the bottom in the longitudinal direction and configured to constitute a stator;
a mover disposed on the two sidewalls in a width direction intersecting the longitudinal direction, the mover being movable in the longitudinal direction;
thrust magnets mounted at a lower side of the mover and selectively corresponding to the multiple coil modules;
a Hall switching board mounted on an inner surface of one of the two sidewalls and having first Hall sensors operated by a magnetic field corresponding to the thrust magnets so that a driver controls phase conversion of the multiple coil modules;
an absolute position measurement board having second Hall sensors provided on one of the two sidewalls; and
position measurement magnets mounted at the lower side of the mover and configured to produce a magnetic field corresponding to the second Hall sensors,
wherein:
corresponding to a unit coil module pitch Pt set between three coil modules of the multiple coil modules disposed in the longitudinal direction, the thrust magnets comprise a first magnet having a first length in the longitudinal direction, and second and third magnets each having a second length which is ½ of the first length, and a pitch Pm2 between two adjacent thrust magnets of the first, second, and third magnets is set as ½ of the unit coil module pitch Pt (Pm2=Pt/2).

7. The linear motor of claim 6, wherein:
the position measurement magnets comprise a first position magnet having a first length in the longitudinal direction, and second and third position magnets having a second length which is ½ of the first length, and a pitch Pp2 of the two adjacent position measurement magnets is set as ⅓ of the unit coil module pitch Pt (Pp2=Pt/3).

8. The linear motor of claim 7, wherein:
a twenty-second pitch P22 between the second Hall sensors provided on the absolute position measurement board is set as ⅓ of the unit coil module pitch Pt (P22=Pt/3).

9. A linear motor control system comprising:
multiple coil modules configured to constitute a stator;
a driver configured to operate the multiple coil modules;
a first Hall sensor configured to input a switching signal to the driver to generate a phase conversion signal for a coil module of the multiple coil modules with a magnetic field set by an interaction with a thrust magnet provided on a mover;
an encoder provided in a partial section between the stator and the mover;
a second Hall sensor configured to generate a position signal for the mover with a magnetic field set by an interaction with a position measurement magnet provided on the mover; and
a control unit configured to apply the encoder signal and the position signal to the driver,
wherein the driver is configured to control the multiple coil modules based on a signal applied from the control unit and the switching signal applied from the first Hall sensor,
wherein, corresponding to a unit coil module pitch Pt set between three coil modules of the multiple coil modules disposed in a longitudinal direction, two adjacent thrust magnets having the same size are formed in the longitudinal direction, and a pitch Pm between the two adjacent thrust magnets is set as ½ of the unit coil module pitch Pt (Pm=Pt/2).

10. A linear motor control system comprising:
multiple coil modules configured to constitute a stator;
a driver configured to operate the multiple coil modules;
a first Hall sensor configured to input a switching signal to the driver to generate a phase conversion signal for a coil module of the multiple coil modules with a magnetic field set by an interaction with a thrust magnet provided on a mover;
an encoder provided in a partial section between the stator and the mover;
a second Hall sensor configured to generate a position signal for the mover with a magnetic field set by an interaction with a position measurement magnet provided on the mover; and
a control unit configured to apply the encoder signal and the position signal to the driver,
wherein the driver is configured to control the multiple coil modules based on a signal applied from the control unit and the switching signal applied from the first Hall sensor,
wherein, corresponding to a unit coil module pitch Pt set between three coil modules of the multiple coil modules disposed in a longitudinal direction, the thrust magnet comprises a first magnet having a first length in the longitudinal direction, and second and third magnets each having a second length which is ½ of the first length, and a pitch Pm2 between two adjacent thrust magnets of the first, second, and third magnets is set as ½ of the unit coil module pitch Pt (Pm2=Pt/2).

* * * * *